July 23, 1957 W. A. REICH 2,800,235
HAND TRUCK FOR HANDLING BUNCHES OF BANANAS
Filed May 11, 1953
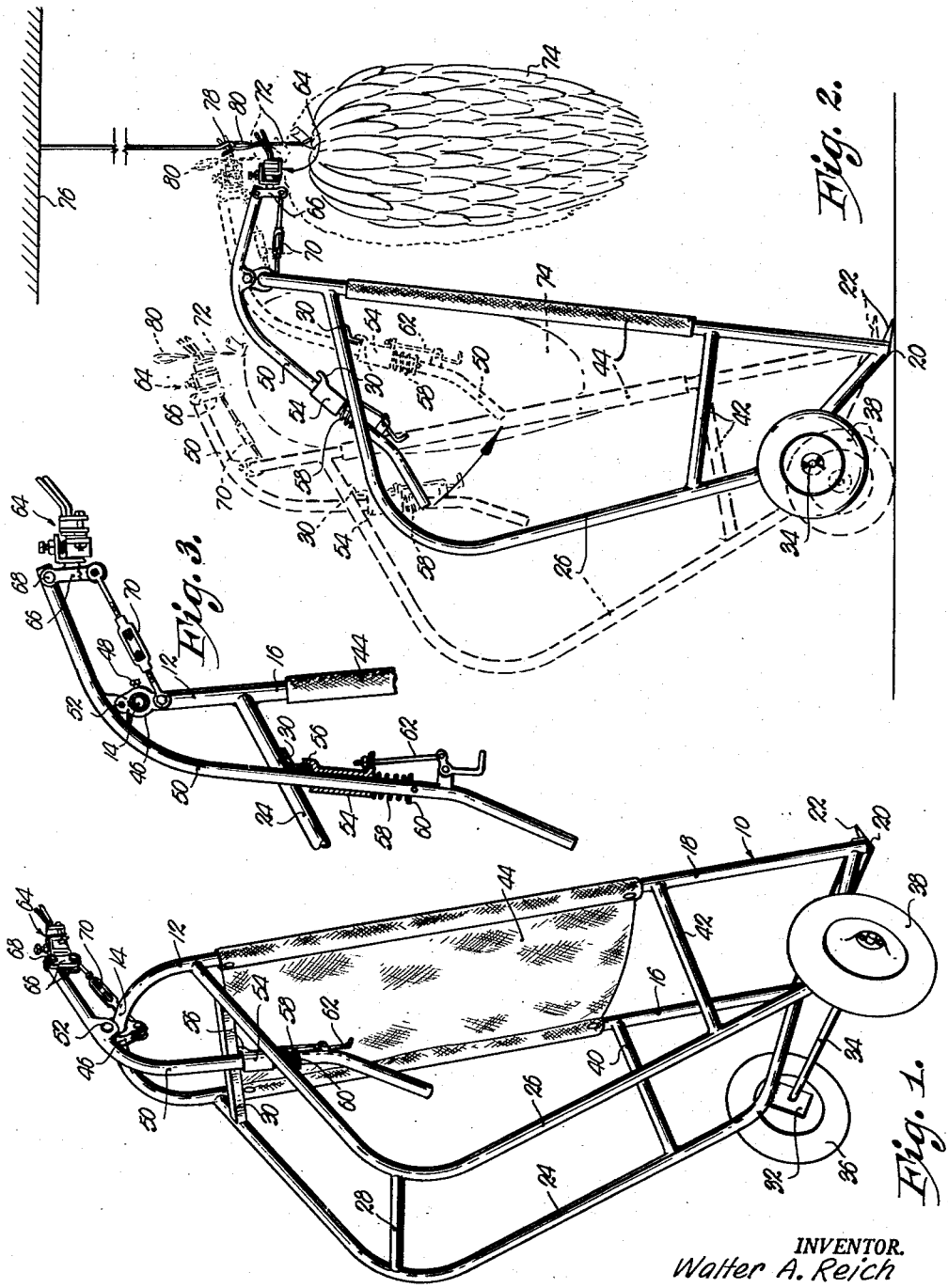
INVENTOR.
Walter A. Reich
BY
ATTORNEY.

2,800,235
HAND TRUCK FOR HANDLING BUNCHES
OF BANANAS

Walter A. Reich, Kansas City, Mo., assignor to A. Reich & Sons, Inc., Kansas City, Mo., a corporation of Missouri Application May 11, 1953, Serial No. 354,274

5 Claims. (Cl. 214—513)

The present invention has to do with improved equipment for handling bananas and has for a primary object the provision of a mobile hand truck having novelty in that the same is adapted to eliminate entirely, manual handling of stalks of bananas in that the same may be tilted and parts thereof shifted so as to permit raising and lowering of the stalks from virtually any position of storage or support, and particularly adapted for facilitating suspension of the stalks from overhead supports.

This is a continuation-in-part of my co-pending application, Serial No. 287,289, filed May 12, 1952, wherein it was pointed out that stalks of bananas must necessarily be handled a large number of times at the point of shipment and prior to actual delivery to the retailer, and that as a result thereof, losses due to damage of the bananas themselves during such handling, were heretofore charged off as a necessary and unavoidable expense. Furthermore, as fully explained in my co-pending application, such manual handling of the banana bunches is a tiresome task and wholesalers generally have been confronted with the problem of employing laborers willing to do that type of work.

There is disclosed therefore, in the said co-pending application, a novel grappling hook mounted on a suitable cart or truck and capable of automatically grasping the tie rope that is placed upon each stalk of bananas at the point of shipment from the plantation.

It is the most important object of the present invention to provide a hand truck adapted to support the grappling hook of said co-pending application for facilitating the carrying of the banana stalk from point to point in and about the wholesale warehouse.

Another important object of this invention is to provide a mobile hand truck having a tiltable frame upon which is mounted a swingable arm that in turn supports the grappling hook, there being a novel interconnection between the hook and the frame for maintaining the hook in a predetermined position as the frame is tilted and as the arm is swung to position the hook properly for receiving the stalk of bananas.

Another object of the present invention is to provide in a hand truck a swingable arm provided with a releasable latch to hold the arm against swinging movement relative to the frame upon which it is mounted, together with a toggle linkage upon which the grappling hook is mounted, and which linkage is adjustable so the proper positioning of the grappling hook is assured when the truck and the arm thereon are manipulated to receive a tie rope on the stalk of bananas.

Other objects include the way in which a wheel and axle assembly is so disposed on the truck to facilitate swinging of the truck from the tilted position upon the wheels; the way in which a flexible apron is provided for receiving the stalk of bananas during carrying thereof by the truck; the manner of providing anti-slip prong means on the truck at its point of tilting movement; and many details of construction to be made clear as the following specification progresses.

In the drawing:

Figure 1 is a rear perspective view of a hand truck for handling bunches of bananas made pursuant to the present invention.

Fig. 2 is a side elevational view thereof, illustrating two positions of the truck; and Fig. 3 is a fragmentary, cross-sectional view through the truck at the uppermost end thereof.

A frame, broadly designated by the numeral 10 in the drawing, includes a U-shaped member 12 having a bight 14 at its uppermost end and a pair of parallel legs 16 and 18. Legs 16 and 18 are joined at the lowermost ends thereof by an L-shaped base plate 20 provided with a pair of forwardly extending anti-slip prongs 22.

A pair of rearwardly extending, arcuate handle bars 24 and 26 joined to the legs 16 and 18 respectively, are interconnected by cross members 28 and 30, the latter being L-shaped in cross-section as seen in Fig. 3. Brackets 32 depending from the handle bars 24 and 26, journal an axle 34 that receives a pair of wheels 36 and 38. Legs 16 and 18 are also joined with their handles 24 and 26 by braces 40 and 42 respectively. Legs 16 and 18 are joined by an apron 44 above the braces 40 and 42.

A clamp 46 on the bight 14 and secured thereto by a setscrew 48, swingably receives an elongated arm 50 by means of a pivot pin 52. A reciprocable latch 54 on the arm 50 has an ear 56 normally engaging the cross piece 30. Latch 54 is biased upwardly by a spring 58 coiled about the arm 50 above a stop 60. A finger release 62 pivotally secured to the arm 50 is joined to the latch 54 for moving the latter downwardly on the arm 50 against the action of spring 58 to release the arm 50 for free swinging movement on pivot pin 52.

A grappling hook, broadly designated by the numeral 64, is rigidly secured to a pair of links 66 that embrace the arm 50 at its uppermost end and are pivotally secured thereto by a pin 68. The links 66 are in turn pivotally connected with the clamp 46 by extensible means in the form of a turnbuckle 70.

The form and nature of the grappling hook 64 is fully disclosed and claimed in my co-pending application above-identified, and forms no part of the present invention and it may be pointed out that any suitable means may be mounted on the links 66 capable of receiving and grasping a tie rope 72 that is normally mounted on banana stalks 74 at the point of initial shipment from the plantation. In the grappling hook 64 illustrated herein, the weight of the stalk of bananas 74 causes the grappling means 64 to grasp the rope 72 tightly until the weight is removed therefrom.

The hand truck hereof may be used to remove the bananas from the refrigerator car and carry the same into the warehouse for suspension from the ceiling 76 thereof upon hooks 78 depending therefrom. A loop 80 in the rope 72 receives the hook 78. The hand cart may also be used to remove the stalk of bananas 74 from the hook 78 and to carry the same into successive ripening rooms or to aid the workmen in moving the stalk of bananas 74 from a hook 78 to a similar hook not herein shown, on an overhead conveyor. In any event the stalks of bananas are normally handled a large number of times before actual delivery to retail establishments, and through use of the hand truck hereof, considerable labor and energy is saved and virtually all damage to the bananas themselves is eliminated.

Assuming the stalk 74 to be suspended from hook 78, the hand cart hereof is used in the following manner to remove the stalks 74 and positioning the same for carrying thereby. The operator grasping handles 24 and 26, rolls the truck upon the wheels 36 and 38 to a position adjacent the suspended stalk 74 and thereupon uses the base 20 and/or prongs 22 as a fulcrum for tipping the entire truck off the wheels 36 and 38 to the position illustrated by full lines in Fig. 2 of the drawing. He thereupon squeezes the finger piece 62 toward the arm 50 to release the latch 54 and swings arm 50 to the full line position shown in Fig. 2. As the arm 50 is swung upwardly and rearwardly away from the cross member 30, the grappling hook 64 moves downwardly, but the position of the grapping means 64 remains substantially the same with respect to the horizontal, inasmuch as the turnbuckle 70 maintains the links 66 substantially vertical. After the grappling means 64 has been moved to a position for receiving the rope 72, downward swinging movement of the arm 50 in the direction of the arrow in Fig. 2, causes the grappling means 64 to first engage and grasp the rope 72 and thereupon, to raise the rope 72 and the stalk 74 to a position where the loop 80 may be easily removed from the hook 78.

The operator latches the arm 50 to the cross member 30 and thereupon, through use of the handle bars 24 and 26, swings the truck rearwardly to the dotted line position shown in Fig. 2 where it rests upon wheels 36 and 38. The stalk of bananas 74 swings to a position resting on the canvas apron 44 and the operator may tilt the truck to any desired angle on the axle 34 as a fulcrum and transport the bunch of bananas 74 to a new location. If the stalk is to be again mounted on an overlying support such as a hook as at 78, upon similar means depending from an overhead conveyor, the procedure just above outlined, is reversed and it is unnecessary for the workman to handle the stalk 74 in any manner.

It is now appreciated that the task of lifting and carrying the relatively bulky and heavy stalk of bananas is eliminated through employment of the hand truck hereof and it is to be further appreciated that losses heretofore experienced in damaged bananas, are virtually eliminated when the truck is placed in use in the manner hereinabove described.

Having thus described the invention what is claimed as new and desired to be secured by Letters Patent is:

1. A hand truck for handling a stalk of bananas comprising a normally upright frame; a wheel and axle assembly attached to the frame rearwardly of the latter, said frame being tiltable on the lowermost end thereof to and from a position placing said assembly in supporting relationship to the frame; a grappling hook; means mounting said hook on the frame at its uppermost end forwardly thereof; and a flexible aprong on the frame intermediate the ends thereof for receiving the bananas when supported by the hook and when the frame is tilted upon the assembly.

2. A hand truck for handling a stalk of bananas comprising a normally upright frame; a wheel and axle assembly attached to the frame rearwardly of the latter, said frame being tiltable on the lowermost end thereof to and from a position placing said assembly in supporting relationship to the frame; a grappling hook; means mounting said hook on the frame at its uppermost end forwardly thereof; and arcuate handle bars rearwardly of the frame and joined thereto at its uppermost and lowermost ends, said assembly being attached to the handle bars.

3. A hand truck for handling a stalk of bananas comprising a normally upright frame; a wheel and axle assembly attached to the frame rearwardly of the latter, said frame being tiltable on the lowermost end thereof to and from a position placing said assembly in supporting relationship to the frame; a grappling hook; means mounting said hook on the frame at its uppermost end forwardly thereof; and prong means on the frame at said lowermost end thereof for holding the frame against slipping during tipping.

4. A hand truck for handling a stalk of bananas comprising a normally upright frame tiltable on the lowermost end thereof; an arm swingable on the frame; a grappling hook adapted to receive said stalk of bananas; and means connecting the hook with the arm and the frame for maintaining the hook in a predetermined position upon tilting of the frame in one direction and swinging of the arm relative to the frame in one direction, said means including a first link pivotally secured to the arm and a second link pivotally interconnected oppositely to the link and the frame, the hook being mounted on the first link.

5. A hand truck as set forth in claim 4, wherein said second link is adjustably extensible.

References Cited in the file of this patent

UNITED STATES PATENTS

| | | |
|---|---|---|
| 310,362 | Bestor | Jan. 6, 1885 |
| 907,923 | Walsh | Dec. 29, 1908 |
| 1,015,393 | Murphy | Jan. 23, 1912 |
| 1,438,334 | Sabin | Dec. 12, 1922 |
| 1,728,081 | Rust | Sept. 10, 1929 |
| 1,856,082 | Remde | May 3, 1932 |
| 1,868,562 | Chubb et al. | July 26, 1932 |
| 1,870,097 | Coller | Aug. 2, 1932 |
| 2,543,381 | Rosenzweig | Feb. 27, 1951 |
| 2,620,937 | Halloran | Dec. 9, 1952 |
| 2,636,626 | Ireland | Apr. 28, 1953 |
| 2,644,598 | Winslow | July 7, 1953 |
| 2,670,095 | Blatz | Feb. 23, 1954 |
| 2,699,697 | Kelso | Jan. 18, 1955 |

FOREIGN PATENTS

| | | |
|---|---|---|
| 488,295 | Germany | Dec. 23, 1929 |